(12) United States Patent
Schwartz et al.

(10) Patent No.: US 7,819,968 B2
(45) Date of Patent: Oct. 26, 2010

(54) STIR-IN PIGMENT PREPARATIONS FOR COLORATION OF ENERGY CURABLE SYSTEMS

(75) Inventors: Russell J. Schwartz, Cincinnati, OH (US); Darren Mark Ortalano, Cincinnati, OH (US); Darleen Rae Wright, Hamilton, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 549 days.

(21) Appl. No.: 11/717,738

(22) Filed: Mar. 14, 2007

(65) Prior Publication Data

US 2008/0227006 A1   Sep. 18, 2008

(51) Int. Cl.
*C08K 5/00*   (2006.01)

(52) U.S. Cl. .................. 106/494; 106/493; 523/160; 523/161

(58) Field of Classification Search .............. 523/160, 523/161; 106/410, 411, 412, 413, 493, 494
See application file for complete search history.

(56) References Cited

U.S. PATENT DOCUMENTS

| | | | |
|---|---|---|---|
| 6,284,816 B1 * | 9/2001 | Laksin et al. | 523/160 |
| 6,316,517 B1 | 11/2001 | Dones et al. | |
| 2002/0068772 A1 * | 6/2002 | Laksin et al. | 523/160 |
| 2003/0176523 A1 | 9/2003 | Murphy et al. | |
| 2003/0189682 A1 | 10/2003 | Yamagata et al. | |
| 2005/0124727 A1 * | 6/2005 | Huber et al. | 523/160 |

* cited by examiner

*Primary Examiner*—David Wu
*Assistant Examiner*—Vu A Nguyen
(74) *Attorney, Agent, or Firm*—Dickstein, Shapiro, LLP.

(57) ABSTRACT

A dry colorant composition is disclosed and contains (a) pigment; (b) inert carrier; and (c) rheological additive having the structure:

$$P-(U-Y)_s$$

wherein P is the residue of an organic colorant, Y is a polyalkylene oxide or polyalkylene moiety, U is a linking moiety covalently bonding Y to P, and s is an integer from 1 to 3.

21 Claims, No Drawings

STIR-IN PIGMENT PREPARATIONS FOR COLORATION OF ENERGY CURABLE SYSTEMS

FIELD OF THE INVENTION

The present invention relates to pigment composition as well as the process of manufacturing said pigment compositions for the coloration of energy curable systems for various applications.

BACKGROUND OF THE INVENTION

Pigment is traditionally dispersed into energy curable acrylated oligomers and monomers using of a 3-roll mill. The oligomers are very typically based upon epoxy or polyester chemistry, although other specialty oligomers are available. These are used to help disperse the pigment into the monomers and provide for good flow characteristics, although their viscosity is relatively high. The monomers can be mono-acrylates, di-acrylates or acrylates of higher functionality, but these are typically poor pigment dispersants. The monomers are used as carriers or diluents because they have much lower viscosity than the oligomers, and thus provide viscosity reduction, but they contribute to poor flow properties in highly pigmented dispersion bases.

The 3-roll mill process requires materials that have good flow characteristics. As a result, a high concentration of oligomer is necessary, while keeping monomer levels to a minimum. A typical dispersion base may contain 25%-40% pigment, 40%-50% oligomer and 10% 35% monomer, and typically will not be free flowing at room temperature. Commercial additives, such as those from Byk Chemie or Lubrizol (Solsperse), can be used to help improve flow in these bases. Additionally, Solsperse-type additives are utilized for pigment dispersion for UV ink jet applications, in which high-impact media milling is employed. This is described in U.S. Pat. No. 6,534,128 and WO 99/29788.

Grafted pigment additives such as those described in U.S. Pat. No. 6,284,816 have a significant effect on improving flow in pigment dispersion bases for energy curable systems. The advantage in using these additives is that higher pigment loading can be achieved with much improved flow. Oligomer content can be reduced relative to the pigment, while increasing the amount of monomer. The higher monomer levels do not pose flow problems, and in fact, they act as efficient viscosity reducers in these systems. These bases may be 3-roll milled at high pigment solids without detrimental effects. Additionally, these bases are amenable to high impact media milling. A typical dispersion base of this type will contain 30%-45% pigment, 3%-8% additive, 10%-30% oligomer and 17%-57% monomer. Dispersions produced with this approach are free-flowing at room temperature and have low viscosities.

Mixing pigment, a particle surface modifier (such as a polyolefin), oil and carrier resin followed by extrusion is described in WO 96/00261. This is then incorporated into various inks, including energy curable lithographic inks.

Flushers or attritors are well-known methods of dispersing pigment for conventional (i.e., non-energy curable) printing inks, such as making flush color for publication printing. The method of production of flush color involves removing water from a presscake in the presence of a hydrophobic resin. The water breaks away (separates) from the hydrophobic pigment and resin, and is removed. The pigment is dispersed into the resin by the kneading action of the blades. U.S. Pat. No. 6,316,517 describes flushing pigment presscake into a modified acrylate reactive oligomer for energy curable application. No additional additive technology is employed in this case.

Another approach is to use an attritor in combination with vacuum and heat to evaporate water from presscake, followed by kneading action to disperse pigment into a hydrophobic resin. Finally, dry pigment, that is a solid material, can also be employed in an attritor, where the shearing action of the kneader blades facilitate pigment dispersion.

SUMMARY OF THE INVENTION

The present invention provides a dry colorant composition, that is a solid composition, comprising:
(a) pigment;
(b) an inert carrier; and
(c) a rheological additive having the structure:

$$P-(U-Y)_s$$

wherein P is the residue of an organic colorant, Y is a polyalkylene oxide or polyalkylene moiety, U is a linking moiety covalently bonding Y to P, and s is an integer from 1 to 3.

The present invention also provides a method for preparing a dry colorant composition comprising combining:
(a) pigment;
(b) an inert carrier; and
(c) a rheological additive having the structure:

$$P-(U-Y)_s$$

wherein P is the residue of an organic colorant, Y is a polyalkylene oxide or polyalkylene moiety, U is a linking moiety covalently bonding Y to P, and s is an integer from 1 to 3.

The present invention further provides an energy curable ink comprising:
(a) a dry colorant composition comprising pigment; an inert carrier; and rheological additive having the structure:

$$P-(U-Y)_s$$

wherein P is the residue of an organic colorant, Y is a polyalkylene oxide or polyalkylene moiety, U is a linking moiety covalently bonding Y to P, and s is an integer from 1 to 3 and;
(b) an energy curable liquid vehicle.

The dry colorant composition has a pasty (waxy), thick nature but surprisingly can be used for flexographic ink formulations where they help achieve the desired low viscosity typical of such inks. The dry colorant preparation can be easily mixed into typical energy curable inks with low shear mixing, including shaking, without the necessity of a separate dispersion step.

Other objects and advantages of the present invention will become apparent from the following description and appended claims.

DETAILED DESCRIPTION OF THE INVENTION

This invention pertains to a composition and process of making a dry colorant preparation that will easily mix into typical energy curable inks with conventional mixing (e.g., Cowles blade) to yield an energy curable ink with high color value and low viscosity. The pigment is combined with an additive and mixed with an inert carrier. A typical dry colorant composition contains about 40 to about 80% by weight pigment, about 5 to about 20% by weight additive and about 10 to about 30% inert carrier.

The nature of the carrier is not restricted as long as it does not, at the concentration employed, convert the preparation into a semisolid or liquid. Before combination, the carrier need not be a solid. Preferably, the carrier is a food grade material, such as sorbitan mono-stearate or sorbitan tristearate. Also preferably, the carrier is an aliphatic solvent such as ink oils, mineral oils or vegetable oils.

Again preferably, the additive has the general structure

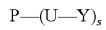

wherein P is the residue of an organic colorant, Y is a polyalkylene oxide or polyalkylene moiety, U is a linking moiety covalently bonding Y to P, and s is an integer from 1 to 3.

The pigment, additive and carrier are combined in a suitable processing equipment, such as an attritor, flusher or mix muller. Presscake may be employed, where a typical flush process is then facilitated. Dry color can also be employed in an attritor, where the shearing action of the kneader blades facilitate pigment dispersion. Attritors can be used in combination with vacuum and heat to evaporate water from presscake, followed by kneading action to disperse pigment into the carrier.

The energy curable liquid vehicle typically comprises one or more low molecular weight mono- or multi-functional monomers. For offset inks and other inks which require higher viscosities, a resin, a reactive oligomer or polymer may also be present. The ink of the present invention may be cured thermally or cured by actinic radiation sources, such as electron beams and the like; or photolytically cured by actinic radiation, such as UV radiation and the like, when a suitable initiating system is incorporated into the ink. The solvent-free, energy curable ink of this invention is more fully described below.

Pigment

The pigment is any organic pigment that can be employed for the coloration of conventional printing inks of the prior art. The pigment may also be Pigment Black 7 (carbon black) or other inorganic pigments, such as Pigment White 6 (Titanium Dioxide), Pigment Black 11 (Black Iron Oxide), Pigment Red 101 (Red Iron Oxide) and Pigment Yellow 42 (Yellow Iron Oxide). Among those pigments suitable for use in the present invention are conventional organic pigments such as: Pigment Yellow 1, Pigment Yellow 3, Pigment Yellow 12, Pigment Yellow 13, Pigment Yellow 14, Pigment Yellow 17, Pigment Yellow 37, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment 26 Yellow 126, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 112, Pigment Red 146, Pigment Red 170, Pigment Red 196, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23, or carbon black, including Pigment Black 7 and the like.

Rheological Additive

The rheological additive is a polyalkylene oxide or a polyalkylene covalently bonded (i.e. grafted) to the residue of an organic colorant and has the structure P—(U—Y)$_s$, in which P is the residue of an organic colorant, Y is a polyalkylene oxide or polyalkylene moiety containing about 4 to about 400 alkylene oxide or alkylene repeating units, U is a linking moiety covalently bonding Y to P and s is an integer from 1 to 3. Such rheological additive are known in the art and are for instance described in U.S. Pat. Nos. 4,946,508; 4,946,509; 5,024,698; 5,062,894; and 6,284,816, each of which is incorporated herein by reference.

Typically, P is a residue of a pigment, such as, a residue of an azo pigment, phthalocyanine pigment, dioxazine pigment, quinacridone pigment, perylene pigment, perinone pigment or the like. Preferably, P is the residue of a diarylide pigment, monoazo pigment, diazo pyrazolone pigment, phthalocyanine pigment, or perylene pigment.

The polyalkylene oxide moiety, Y, may be the residue of any polyalkylene oxide such as an ethylene oxide polymer, propylene oxide polymer, ethylene oxide/propylene oxide copolymer and the like. Preferably, Y is an alkylene oxide copolymer having the general formula:

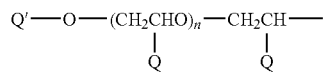

wherein n is about 4 to about 400 and more preferably is about 4 to about 60; Q is H, CH$_3$ or a combination thereof; and Q' is a C$_{1-6}$ alkyl moiety. The weight average molecular weight of the polyalkylene oxide moiety typically is between about 300 and 3,600; and preferably between about 1,000 and 3,000. The polyalkylene oxide moiety, Y, may be grafted to the residue of an organic colorant, P, through a linking moiety, U, which is preferably a covalent bond or multivalent moiety such as C$_{1-6}$ alkyl, —NHSO$_2$—, —O—, —CO—, —COO—, —N—, —CONH—, and the like. It is understood that the particular linking moiety employed will be determined by those skilled in the art depending on the nature of P. The polyalkylene moiety is preferably polyisobutylene.

U.S. Pat. No. 4,946,508 discloses diazo pyrazolone compositions which contain said rheological additives and their method of manufacture. Such diazo pyrazolone pigment compositions have the general formula:

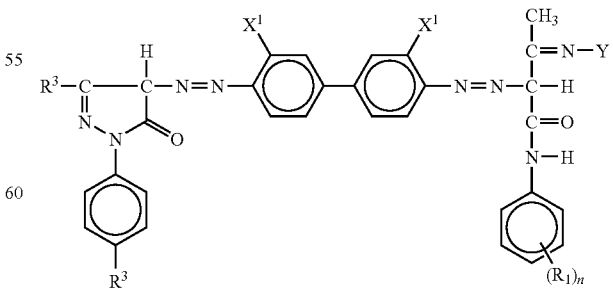

wherein Y is the polyalkylene oxide moiety; R$^1$ is H, CH$_3$, OCH$_3$, OCH$_2$CH$_3$ or Cl; n is selected from an integer from 1 to 5; $R_2$ is $CH_3$ or $COOCH_2CH_3$; $R_3$ is H or $CH_3$; and $X^1$ is Cl or $OCH_3$.

U.S. Pat. No. 4,946,509 discloses azomethine compositions and their method of manufacture. Such azomethine pigment compositions have the general formula:

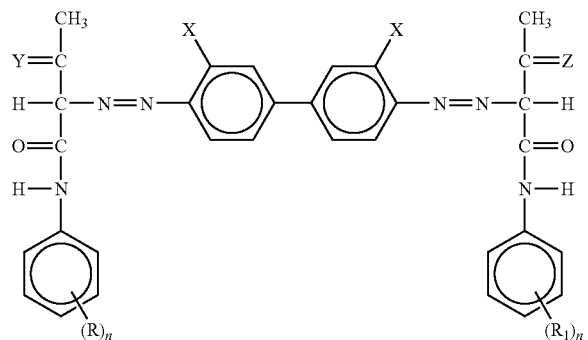

wherein Y is a polyalkylene oxide moiety containing about 4 to about 200 groups; R and $R^1$ are independently selected from the group consisting of H, CH, $OCH_3$, $OCH_2$ $CH_3$ and Cl; n is selected from an integer from 1 to 5; X is selected from the group consisting of Cl, $CH_3$, and $OCH_3$; and Z is selected from O and N—Y.

U.S. Pat. No. 5,024,698 discloses monoazomethine compositions and their method of manufacture. Such monoazomethine pigments have the general formula:

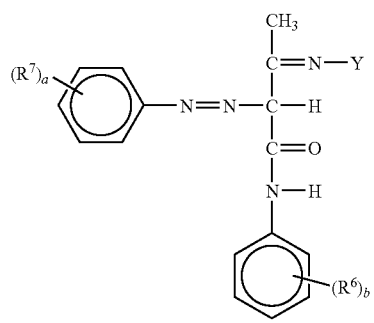

wherein Y is the polyalkylene oxide moiety; $R^6$ is independently selected from the group consisting of Cl, OCH, $CH_3$, $OC_2H_5$, $C_2H_5$, and $CONH_2$; $R^7$ is independently selected from the group consisting of Cl, $OCH_3$, $CH_3$, $NO_2$, $OC_2H_5$, $C_2H_5$, $CONH_2$, $SO_3H$, OH and COOH; and a and b are independently selected from integers 0 to 5.

U.S. Pat. No. 5,062,894 discloses diarylide compositions and their method of manufacture. Such diarylide pigment compositions have the general formula:

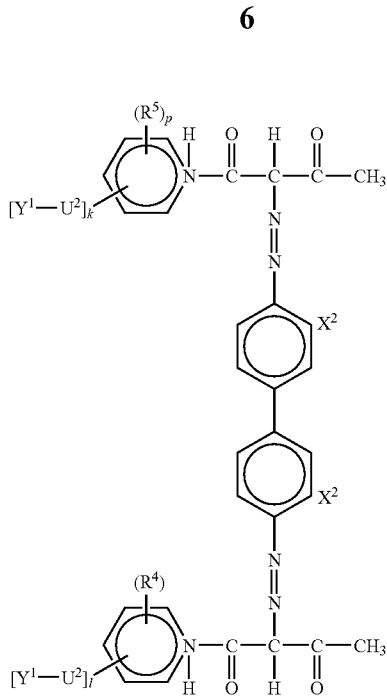

wherein $R^4$ and $R^5$ are independent selected from the group consisting of $C_1$-$C_4$ alkyl, $C_1$-$C_4$ alkoxy, and halogen; m and p are independent selected from integers of 0 to 5; $X^2$ is selected from the group consisting of Cl, $CH_3$, and $OCH_3$; $U^2$ comprises a divalent bridging moiety selected from the group consisting of $C_1$-$C_6$ alkyl, —$NHSO_2$—, —O—, —CO—, —COO—, and —COH—; $Y^1$ comprises the polyalkylene oxide moiety having a number average molecular weight of about 200 to 10,000; and k and l are independently selected from integers 0 or 1, with the proviso that for least 50 wt. % of the composition, k and l are both 0, and for at least 3 wt. % of the composition k and/or l are 1.

Other rheological additives, particularly useful in the energy curable inks of this invention, include phthalocyanine compositions having the P—U—Y structure in which P is the residue of a copper phthalocyanine pigment and wherein the linking moiety, U, is —$NHSO_2$— which joins P to Y. Such copper phthalocyanine based rheological additives have the formula:

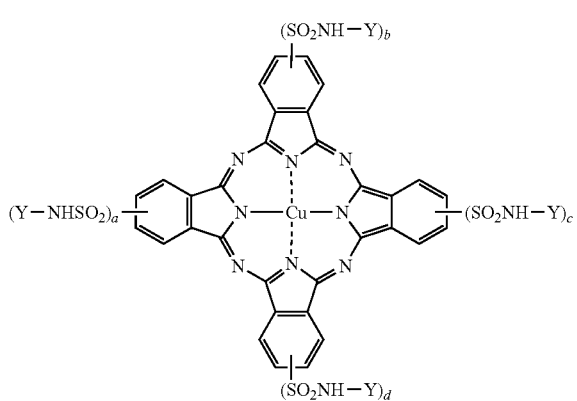

wherein Y is a polyalkylene oxide or polyalkylene moiety which has the general formula:

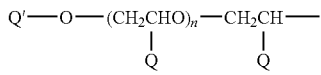

wherein n is about 4 to about 400, and a, b, c and d are integers independently from 0 to 4, provided at least one of them is 1; Q is selected from H, $CH_3$ or a combination thereof; and Q' is a $C_1$-$C_6$ alkyl moiety.

The rheological additive used in this invention may be prepared by any conventional method. Illustrative methods for preparing the pigments with the rheological additives described herein are disclosed in U.S. Pat. Nos. 4,946,508; 4,946,509; 5,024,698; and 5,062,894.

The pigment compositions used in this invention typically contain a minor portion of said rheological additive and a major portion of the conventional pigment. The residue of the organic colorant that is contained in the rheological additive does not need to be of the same type as the pigment of the ink formulation.

Energy Curable Liquid Vehicle

The solvent-free, energy curable ink of this invention contains a quantity of an energy curable liquid vehicle which is substantially free of fugitive solvent. The quantity of liquid vehicle employed is an amount sufficient to make up 100% of the ink weight when taken together with other ink components. The radiation curable liquid vehicle typically comprises one or more low molecular weight mono-functional or multi-functional monomers. For offset inks and other inks which require higher viscosities, a resin, a reactive oligomer or polymer may also be present. These components may react with the monomers upon curing. The energy curable liquid vehicle is characterized in that it is curable to a solid by exposure to energy from a radiant or thermal energy source as described above. The liquid vehicle may be cured to a solid by exposure to energy, such as exposure to high energy electrons from an electron beam source. Alternatively, curing of the liquid vehicle may be initiated by energy activation of a polymerization initiating system (e.g., by UV radiation) as will be described in more detail below. In this context, a polymerization initiating system may be considered an optional component of the energy curable liquid vehicle. The liquid vehicle may be a ring opening polymerizable composition, a free radical addition polymerizable composition, or by a combination of ring opening and free radical polymerization. In either composition, the liquid vehicle is cured or hardened by polymerizing and/or crosslinking, at least the reactive monomers of the liquid vehicle. In order to reduce environmental contamination and maintain formulation integrity, the liquid vehicle is typically formulated with components having low volatility under ambient printing conditions.

When the liquid vehicle is a ring opening polymerizable composition, it forms a polymer typically bound by ester, or ether linkages upon energy initiation.

Preferably, the polymerizable composition is a cationic polymerizable system comprising one or more mono-functional or multi functional epoxides. The liquid vehicles typically contain at least one cycloaliphatic epoxide. Examples of such cycloaliphatic epoxides are adducts of epoxides and hydroxyl components such as glycols, polyols, or vinyl ether, such as 3,4-epoxycyclohexylmethyl 3,4-epoxy-cyclohexane carboxylate; bis(3,4-epoxy-cyclohexyl-methyl)adipate; limonene monoepoxide; limonene diepoxide; diglycidyl ester of hexahydrophthalic acid; 1-vinyl-3,4-epoxycyclohexane; epoxidized dicyclopentyl alcohol; or a mixture thereof. Preferred cycloaliphatic epoxides of this type are 3,4-epoxycyclohexylmethyl 3,4-epoxy-cyclo-hexylcarboxylate and 1,3-bis(2-(7-oxabicyclo(4.1.0)hept-3-yl) ethyl)-1,1,3,3-tertramethyldisiloxane. In addition to the cycloaliphatic epoxides there may be one or more non-cycloaliphatic epoxides, such as di- or tri-glycidyl ether, alkoxylated bisphenol A, 1,6-hexane diol, glycerol; neopentylglycol; or trimethylolpropane. The epoxy diluent likewise may be diglycidyl ether of bisphenol A; an alpha-olefin epoxide, a Novolak epoxide, epoxidized linseed oil, soy oil; epoxidized polybutadiene; 1,2-epoxydecane; caprolactone triol; glycidyl ether; alkyl glycidylether; epoxidized silanes; glycidoxymethoxysilane; glycidoxyethoxysilane and 2-ethyl-hexylglycidyl ether. In such epoxy compositions, the ink typically contains a cationic initiating system activatable by actinic radiation as will be described below. A preferred epoxy diluent is 2-ethylhexyl-glycidyl ether. In such epoxy compositions, the ink typically contains a cationic initiating system activatable by actinic radiation as will be described below.

When the energy curable liquid vehicle is a free radical addition polymerizable composition, the vehicle comprises a liquid compound having terminal ethylenic unsaturation.

Typically, the liquid vehicle is a free radical addition polymerizable system comprising an ethylenically unsaturated mono- or multi-functional monomer. The monomer is a lower molecular weight ethylenically unsaturated compound which forms a polymer directly upon initiation by free radicals generated by absorbed energy. In some formulations an oligomeric or polymeric component which can be further polymerized may also be present. In such cases the further polymerizable material will be soluble in, or dispersible in the monomer vehicle.

Typically, the monomeric compounds have one, two, or more terminal ethylenically unsaturated groups. Representative of such monomeric compounds are: N-vinyl pyrrolidinone; dipropylene glycol diacrylate; tripropylene glycol diacrylate; butanediol diacrylate; hexanediol diacrylate; trimethylol propane triacrylate; ethoxylated trimethylol propane triacrylate; glycerol-propoxy triacrylate; pentaerythritol triacrylate; dipropylene glycol dimethacrylate; tripropylene glycol dimethacrylate; butanediol dimethacrylate; hexanediol dimethacrylate; trimethylol propane trimethacrylate; di-(3-methacryloxy-2-hydroxypropyl ether) of bisphenol-A; di(2methacryloxyethyl ether) of bisphenol-A; di-(3-acryloxy-2-hydroxypropyl ether) of bisphenol-A; di(2-acryloxyethyl ether) of bisphenol-A; and the like.

To achieve the desired ink viscosity and crosslinking properties, typically the monomer composition contains a combination of multifunctional acrylic monomers along with a monomer containing a single terminal ethylenic group.

When the inks of this invention contain an oligomeric or polymeric material, said materials typically possess ethylenic unsaturation which can react with the ethylenically unsaturated monomers. Representative of such oligomers are acrylated epoxy resins; acrylated polyurethanes; acrylated polyesters; and the like.

The inks of the present invention may also contain a preformed polymer such as an acrylic polymer or copolymer of $C_1$-$C_4$ alkyl acrylates or methacrylates, or acrylic or methacrylic acid, vinyl polymers and copolymers such as polyvinyl chloride, polyvinyl acetate, polyvinyl alcohol, polyvinylpyrrolidone, cellulosic polymers and copolymers; and the like.

Polymerization Initiating System

Unless the ink is formulated specifically for use with EB curing, it will contain a polymerization initiating system activatable by actinic radiation, such as UV and thermal radiation. Such a photoinitiator system has one or more compounds that directly furnish cations or free radicals when activated by actinic radiation. In the case of UV activation, the photoinitiator system may also contain a sensitizer that extends the spectral response into the ultraviolet, visible and near infrared spectral regions. Cationic polymerization initiating systems typically are used to initiate ring opening polymerization in systems such as the epoxy compositions described herein. Such cationic initiating systems include all substances which liberate Lewis acids or Broensted acids upon exposure to actinic radiation. Cationic photoinitiating systems which are particularly useful in the energy curable inks of this invention are arylsulfonium salts, especially the triarylsulfonium salt such as triarylsulfonium phosphate, triarylsulfonium antimonate, triphenylsulfonium hexafluorophosphate, and diarylsulfonium salt; and aryliodonium salts, such as diaryliodonium hexafluoroantimonate, bisdodecyldiphenyliodonium hexafluoroantiminoate, and the like. Such cationic photoinitiators may be used individually or in combination to effect suitable curing of the ink. Preferred are diaryliodonium hexafluoroantimonate and ($n^5$-2,4-cyclopentadienyl) [(1,2,3,4,5,6-n) (1-methylethyl)benzene]-iron$_+$-hexafluorophosphate(-1).

In free radical initiated curing systems such as the UV curable inks disclosed herein, typically irradiation of a photoinitiator produces free radicals that initiate polymerization. A wide variety of photoinitiators may be used in the energy curable inks of this invention. A few are described, for example, by B. M. Monroe and G.C. Weed in Photoinitiators for Free Radical Initiated Photo-Imaging Systems, Chem. Rev. 93, pp. 435-48 (1993), incorporated herein by reference, describes thioxanthone, ethyl 4-(dimethylamino)benzoate, alpha amino acetophenone, and Michler's ketone as photoinitiators.

Adjuvants

The radiation curable inks of this invention may optionally contain the usual adjuvants to adjust ink flow, surface tension, surface penetration and gloss of the cured printed ink. Such adjuvants contained in the ink typically are a surface active agent, a wax, a humectant or a combination thereof. These adjuvants may function as leveling agents, wetting agents, dispersants, defrothers or deareators, or additional adjuvants may be added to provide a specific function. Preferred are isopropyl adjuvants include fluorocarbon surfactants such as FC430, available from 3M Company, St. Paul, Minn.; silicones such as DC57, available from the Dow Chemical Corporation, Midland, Mich.; polyethylene wax; polyamide wax; polytetrafluoroethylene wax; and the like.

Printing Ink Formulation

The solvent-free, energy curable ink contains as its essential ingredients typically about 2 to about 40% by weight of dry colorant composition, and the balance being the liquid energy curable vehicle which is substantially free of a fugitive solvent. The energy curable liquid vehicle typically comprises, one or more low molecular weight mono-functional or multi-functional monomers. For offset inks and other inks which require higher viscosities (>1,000 cps), a resin, a reactive oligomer or polymer may also be present. In addition to the essential ingredients the energy curable ink may also contain up to about 6% by weight of the polymerization initiating system activatable by actinic radiation; and up to about 10% or less by weight of a surface active agent, a wax, humectant or combination thereof.

The ink may be prepared by any conventional mixing and milling method typically used for preparing printing inks. Typically, the colorant compositions are mixed with the liquid vehicle then milled. After milling additional liquid vehicle and any desirable adjuvants are optionally added and mixed to produce the energy curable ink. Ratios are adjusted to achieve a printing ink with the desired viscosity, flow, color density, and curing characteristics.

EXAMPLE 1

Sorbitan tristearate (Span 65K, Uniqema) is melted in an IKA Attritor. C.I. Pigment Blue 15:4 (249-3054, Sun Chemical) is then added. This pigment is composed of 85% C.I. Blue 15:3 and 15% polyalkoxy copper phthalocyanine sulfonamide additive. The mixture is then kneaded for 30 minutes, and is then allowed to cool. It comes out as a dry preparation, with optional osterization to improve consistency. The formula is 68% C.I. Pigment Blue 15:3, 12% polyalkoxy copper phthalocyanine sulfonamide additive and 20% Span 65K.

The dry preparation from above is then mixed into a prototypic UV Flexo ink composition for 10 minutes to realize an ink containing 30% dry colorant preparation, 40% monomer (SR 9003B, Sartomer) and 30% Bis-A-epoxy oligomer diacrylate (CN 2102E, Sartomer). The mean particle size of this ink, as measured by Microtrac UPA 150, is 148 nm.

EXAMPLE 2

Sorbitan tristearate (Span 65K, Uniqema) is melted in an IKA Attritor, and polyalkoxy benzimide is then added. C.I. Pigment Red 57:1 (219-3707, Sun Chemical) is next mixed into the system. This mixture is kneaded for 30 minutes, and is then allowed to cool. The cooled material is a dry preparation, which can be subjected to osterization to improve consistency. The formula is 70% C.I. Pigment Blue 15:3, 10% polyalkoxy benzimide and 20% Span 65K.

The dry preparation is then mixed into a prototypic UV Flexo ink composition for 10 minutes to obtain a composition containing 30% dry colorant preparation, 40% monomer (SR 9003B, Sartomer) and 30% Bis-A-epoxy oligomer diacrylate (CN 2102E, Sartomer). The mean particle size of this ink, as measured by Microtrac UPA 150, is 113 nm.

EXAMPLE 3

Sorbitan tristearate (Span 65K, Uniqema) is melted in an IKA Attritor, and polyalkoxy copper phthalocyanine sulfonamide is added. C.I. Pigment Blue 15:4 presscake (086-4990, Sun Chemical) is then added. Steam is used to evaporate the water, while kneading for 2.5 hours. After cooling, a dry preparation is realized, with osterization to improve consistency. The formula is 70% C.I. Pigment Blue 15:3, 10% polyalkoxy copper phthalocyanine sulfonamide additive and 20% Span 65K.

The dry preparation is then mixed for 10 minutes with a prototypic UV Flexo ink composition at a ratio of 30% dry colorant preparation, 40% monomer (SR 9003B, Sartomer) and 30% Bis-A-epoxy oligomer diacrylate (CN 2102E, Sartomer). The mean particle size of this ink, as measured by Microtrac UPA 150, is 235 nm.

EXAMPLE 4

200 parts of Span 65K available from Uniqema and 100 parts of a polyisobutylene-based dispersant of the formula

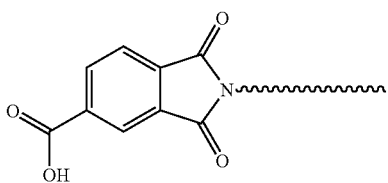

in which the wavy line designates a polyisobutylene moiety were placed into a 1 gallon laboratory mixer and heated to 85° C. 700 parts of Lithol Rubine (20.5% in water) available from Sun Chemical Corp. is added to the mixer and mixed for 45 minutes under reduced pressure. A second 700 parts of the Rubine pigment were added to the mixer and then after 10 minutes, the water was poured off. A third 700 parts of the Rubine were added to the mixer and placed under reduced pressure until water was removed. Two additional pigment additions of 700 parts each were made and the water was removed under reduced pressure. The contents of the mixer were heated to 150° C. to remove all traces of water. The product was then cooled and crushed into a fine powder that contained 70% pigment.

The invention has been described in terms of preferred embodiments thereof, but is more broadly applicable as will be understood by those skilled in the art. The scope of the invention is only limited by the following claims.

What is claimed is:

1. A dry colorant composition which is a combination of:
   (a) pigment;
   (b) inert carrier; and
   (c) rheological additive having the structure:

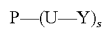
   P—(U—Y)$_s$ wherein P is the residue of an organic colorant, Y is a polyalkylene oxide or polyalkylene moiety, U is a linking moiety covalently bonding Y to P, and s is an integer from 1 to 3, and wherein said combination is a dry solid composition.

2. The composition of claim 1 wherein Y is an ethylene oxide polymer moiety.

3. The composition of claim 1 wherein Y is an ethylene oxide/propylene oxide copolymer moiety.

4. The composition of claim 3 wherein the copolymer has the general formula:

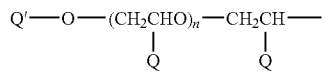

wherein n is about 4 to 400; Q is H, CH$_3$ or a combination thereof; and Q' is C$_1$-C$_6$ alkyl.

5. The composition of claim 4 wherein n is about 4 to 60.

6. The composition of claim 1 wherein Y is polyisobutylene.

7. The composition of claim 1 wherein P is a residue of an azo pigment, phthalocyanine pigment, dioxazine pigment, quinacridone pigment, perylene pigment, or perinone pigment.

8. The composition of claim 1 wherein U is a covalent bond or a multivalent moiety selected from the group consisting of C$_1$-C$_6$ alkyl, —NHSO$_2$—, —O—, —CO—, —COO—, —N— and —CONH—.

9. The composition of claim 1 where s is 1 or 2.

10. The composition of claim 1 wherein the rheological additive is an azomethine having the formula:

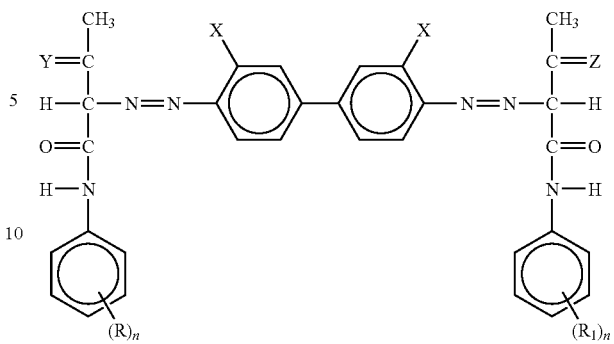

wherein Y is a polyalkylene oxide having about 4 to 200 repeating units; R and R$^1$ are independently selected from the group consisting of H, CH$_3$, OCH$_3$, OCH$_2$CH$_3$, and Cl; n is an integer from 1 to 5; X is selected from the group consisting of C$_1$, CH$_3$ and OCH$_3$; and Z is selected from the group consisting of O and N—Y.

11. The composition of claim 1 wherein the additive is an azomethine having the general formula:

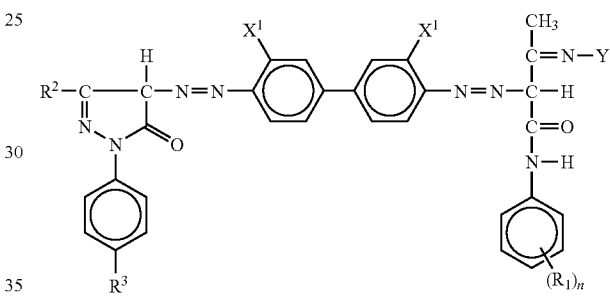

wherein Y is a polyalkylene oxide having about 4 to 20 repeating units; R$^1$ is H, CH$_3$, OCH$_3$OCH$_2$CH$_3$ or Cl; n is an integer from 1 to 5; R$^2$ is C$_3$ or COOCH$_2$CH$_3$; R$^3$ is H or CH$_3$; and X$^1$ is Cl or OCH$_3$.

12. The composition of claim 1 wherein the additive is a diarylide having the general formula:

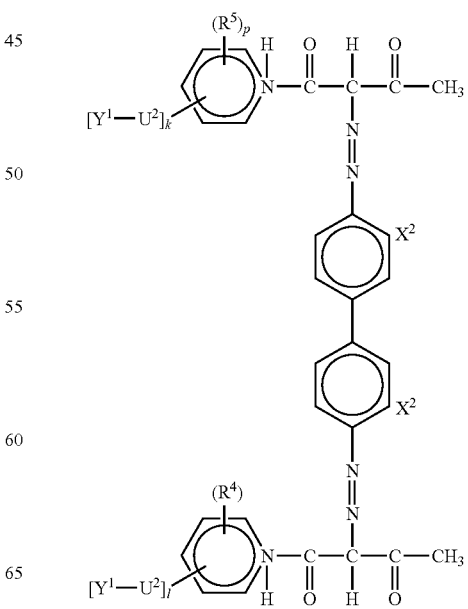

wherein R⁴ and R⁵ are independently selected from the group consisting of $C_1$-$C_4$ alkyl, $C_1$-$C_4$ alkoxy and halogen; m and p are independently integers of 0 to 5; X² is selected from the group consisting of Cl, CH₃ and OCH₃; U² comprises a divalent bridging moiety selected from the group consisting of $C_1$-$C_6$ alkyl, —NHSO₂—, —O—, —CO—, —COO— and —CONH—; Y¹ comprises the polyalkylene oxide having a number average molecular weight of about 200 to 10,000; and k and l are independently integers of 0 or 1, with the proviso that for at least 50 wt. % of the pigment composition, k and l are both equal to 0, and for at least 3 wt. % of the pigment composition 5 k and/or l are equal to 1.

13. The composition of claim 1 wherein the additive is an azomethine having the general formula:

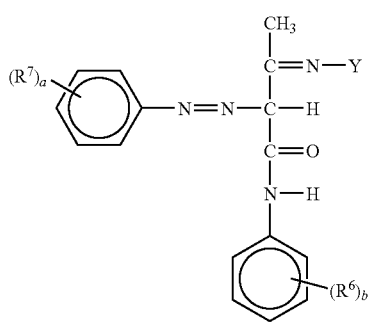

wherein Y is a polyalkylene oxide polymer containing about 4 to 20 repeating units; R⁶ is independently selected from the group consisting of Cl, OCH₃, CH₃, OC₂H₅, C₂H₅ and CONH₂; R⁷ is independently selected from the group consisting of Cl, OCH₃, CH₃, NO₂, OC₂H₅, C₂H₅, CONH₂, SO₃H, OH and COOH; and a and b are independently integers of 0 to 5.

14. The composition of claim 1 wherein the additive is a phthalocyanine having the general formula:

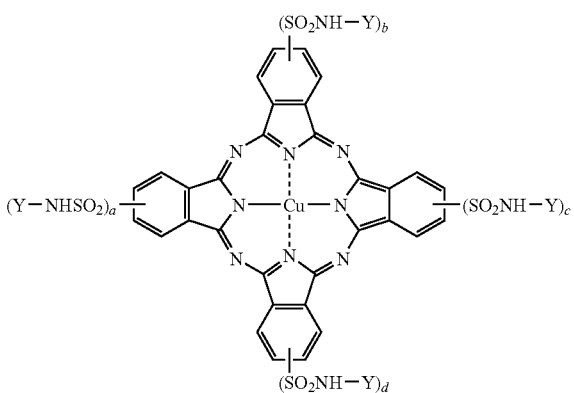

wherein Y is

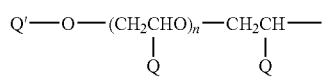

n is about 4 to 400, and a, b, c and d are integers independently from about 0 to 4, provided at least one of them is 1; Q is H, CH₃ or a combination thereof; and Q' is $C_1$-$C_6$ alkyl.

15. The composition of claim 1 wherein the pigment is selected from the group consisting of Pigment Yellow 1, Pigment Yellow 3, Pigment Yellow 12, Pigment Yellow 13, Pigment Yellow 14, Pigment Yellow 17, Pigment Yellow 37, Pigment Yellow 42, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 126, Pigment Yellow 127, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 101, Pigment Red 112, Pigment Red 146, Pigment Red 170, Pigment Red 196, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23, Pigment Black 7 and Pigment Black 11.

16. The composition of claim 1 wherein the pigment and colorant are different.

17. The composition of claim 1 wherein the pigment and colorant are the same.

18. The composition of claim 17 wherein at least two different pigments are present.

19. A dry colorant composition comprising a combination of:
   (a) pigment;
   (b) inert carrier which comprises sorbitan monostearate or tristearate; and
   (c) rheological additive having the structure:

P—(U—Y)$_s$ wherein P is the residue of an organic colorant, Y is a polyalkylene oxide or polyalkylene moiety, U is a linking moiety covalently bonding Y to P, and s is an integer from 1 to 3, and wherein said combination is a dry solid composition.

20. The composition of claim 1, wherein said inert carrier is selected from the group consisting of ink oil, mineral oil and vegetable oil.

21. A method for preparing a dry colorant composition comprising combining:
   (a) pigment;
   (b) an inert carrier; and
   (c) a rheological additive having the structure:

P—(U—Y)$_s$ wherein P is the residue of an organic colorant, Y is a polyalkylene oxide or polyalkylene moiety, U is a linking moiety covalently bonding Y to P, and s is an integer from 1 to 3 wherein the composition is a dry solid composition.

* * * * *